Dec. 5, 1967     J. R. RAIRDEN III, ET AL     3,356,912
POROUS ELECTRODE
Filed Oct. 16, 1964
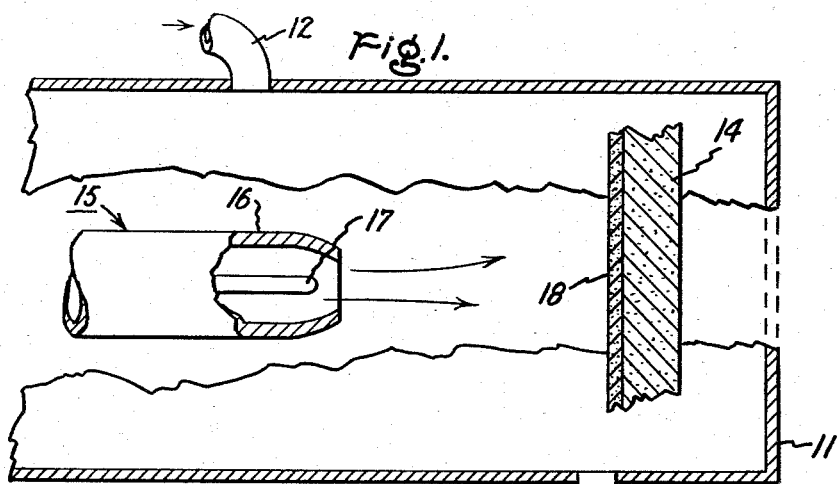
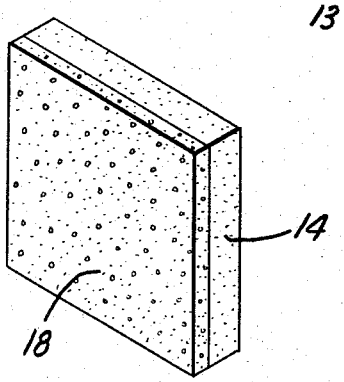
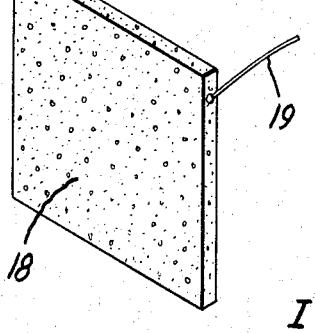
Inventors:
John R. Rairden III,
Ellis W. Blood,
by Paul R. Webb, II
Their Attorney.

United States Patent Office 3,356,912
Patented Dec. 5, 1967

3,356,912
POROUS ELECTRODE
John R. Rairden III, Albany, and Ellis W. Blood, Ballston Lake, N.Y., assignors to General Electric Company, a corporation of New York
Filed Oct. 16, 1964, Ser. No. 404,288
3 Claims. (Cl. 317—235)

ABSTRACT OF THE DISCLOSURE

A self-supporting porous electrode for capacitors, storage batteries, etc. is formed by plasma arc spraying tantalum particles in an argon atmosphere upon a non-porous copper substrate situated 6 to 18 inches from the nozzle of the plasma arc spray gun. Upon cooling of the deposited tungsten particles, the electrode is stripped from the copper substrate by chemical dissolution of the substrate and the electrode is anodized utilizing a dilute phosphoric acid electrolyte to form an oxide layer on the tantalum electrode. An electrical lead then can be applied to the self-supporting porous electrode by any suitable manner, e.g. spot welding to facilitate electrical connection to the electrode.

The disclosure

This invention relates to high melting point metallic electrodes and more particularly to plasma arc spray-deposited electrodes.

Electrodes of various electrically conductive metals are employed in electrolytic devices such as capacitors, condensers, and storage batteries. The electrodes generally are submerged within the electrolyte and a suitable container, such as is portrayed in U.S. Patent 2,251,913, issued Aug. 12, 1941, is employed to house the electrolytic device. Porous electrodes of high melting point metals such as tantalum and niobium are particularly suitable as anodes for solid or liquid electrolytic capacitors.

In U.S. Patent 3,144,328 issued Aug. 11, 1964, there is set forth the conventional sintering procedure for producing self-supporting, porous tantalum anodes. Such procedure includes doping tantalum powder with suitable lubricants or binders to facilitate pressing, pressing the doped powder into anodes of predetermined size, shape, and weight; heating the pressed anodes at low temperatures to volatilize the binder or lubricant, and sintering the anodes at high temperatures in an inert atmosphere or vacuum. This patent describes then an improved sintering process for producing self-supporting, porous tantalum anodes which are produced by placing tantalum powder in a suitable cavity in a graphite block, heating the block in an evacuated furnace at a low temperature to presinter the articles together into a coherent compact, and subsequently placing the presintered anode in a container of tantalum and sintering at a high temperature in a vacuum.

In the heretofore mentioned U.S. Patent 2,251,913, there is described an electrode and a method of producing such an electrode for storage batteries. The electrode is not a self-supporting porous metal but has a base of porous material and a spray-deposited porous conductive layer of minute metallic particles thereon. In U.S. Patent 2,304,073, issued Dec. 8, 1942, there is described a method of making electrodes wherein a porous base is provided with a porous spray deposited conductive layer of lower melting point metallic particles, the layer is impregnated with electrolyte, the layer is heated to enlarge the pores thereof, a film is formed on the surfaces of the particles, the electrolyte is partially dried, and another porous lower melting point metallic conductive layer is spray-deposited upon the impregnated layer. In U.S. Patent 2,626,294, issued Jan. 20, 1953, there is described a storage battery electrode and a method of making wherein the battery has a particulate porous carbon plate impregnated with an active battery oxide, and a coating of porous particulate battery metal thereover. The coating of metal is described as a porous spray-deposited coating of metal.

It would be desirable to provide an improved self-supporting, porous conductive electrode of a high melting point metal which eliminates a sintering method of preparation.

It is an object of our invention to provide a self-supporting, porous conductive electrode of a high melting point metal.

It is another object of our invention to provide a plasma arc spray-deposited electrode.

In carrying out our invention in one form, an electrode comprises a porous conductive layer of minute high melting point metallic particles plasma arc spray deposited at a distance from 6–18 inches.

These and various other objects, features and advantages of the invention will be better understood from the following description taken in connection with the accompanying drawing in which:

FIGURE 1 is a schematic view of apparatus for producing an electrode in accordance with our invention;

FIGURE 2 is a perspective view of an electrode deposited on a mandrel in accordance with our invention; and FIGURE 3 is a perspective view of an electrode embodying our invention.

In FIGURE 1 of the drawing, there is shown schematically apparatus 10 for forming self-supporting electrodes in accordance with this invention. Apparatus 10 comprises an enclosure 11 having an inert gas inlet line 12 and an outlet line 13. Within enclosure 11, there is shown a mandrel 14 in the form of a non-porous metallic substrate and a plasma arc spray gun 15, the nozzle portion 16 of which is shown spaced from and directed toward mandrel 14. An electrode 17 is positioned within nozzle portion 16 of gun 15. A self-supporting electrode 18 is shown which has been formed on mandrel 14.

We found unexpectedly that we could form a self-supporting, porous electrode of a high melting point metal by providing a mandrel, providing an inert gas atmosphere, plasma arc spraying a high melting point metal towards the mandrel within the inert gas atmosphere, depositing a porous conductive layer in the form of minute metallic particles on the mandrel within the inert gas atmosphere, and removing the layer. We found by this method that we could eliminate the conventional sintering process to provide a porous electrode of a high melting point metal. The porous electrode layer is achieved by positioning the spray gun at a relatively large distance from the mandrel. Such a distance is preferably more than six inches and is limited by the distance at which the molten metal particles would solidify and not adhere to the mandrel. We would not expect such particles to adhere to the mandrel if the distance was greater than about 18 inches. Thus, we provide a self-supporting structure and thereby eliminate a supporting base for the electrode. while various metals which have high melting points are suitable in this process, we prefer to use tantalum and niobium.

In the operation of apparatus 10 in FIGURE 1 of the drawing, an inert gas such as argon is fed from a gas supply source (not shown) through inlet line 12 to the chamber defined by enclosure 11. An outlet line 13, which communicates with the chamber of enclosure 11, removes gas from the enclosure by employing any suitable exhausting apparatus (not shown). A conventional plasma arc spray gun 15 is positioned within enclosure 11 and spaced from and directed toward mandrel 14 which is a non-porous metallic substrate of copper.

Plasma arc spray gun 15 employs a carrier gas such as argon which flows through nozzle portion 16 thereof and its outlet end. When gun 15 is activated, the electrical current supplied thereto strikes an arc between electrically conductive tube portion 16 and electrode 17. In this manner, argon gas flowing through the outlet of tube portion 16 is ionized to form argon ions whereby a plasma is created and directed towards mandrel 14. A high melting point metal such as tantalum or niobium is supplied in powder form to device 15 and flowed through its nozzle portion 16 in the argon carrier gas. The plasma formed by the ionized gas heats the metal particles to form a spray of metal which is carried by the plasma and deposited upon the surface of mandrel 14. The inert gas atmosphere within enclosure 11 prevents oxidation of the metal particles which form on mandrel 14.

The metal which is sprayed by the plasma from gun 15 onto mandrel 14 deposits on the mandrel as a porous conductive layer of minute metallic particles. After the metallic layer is formed on mandrel 14 to the desired thickness, device 15 is turned off and layer 18 is allowed to cool to room temperature. Subsequently, the inert gas atmosphere is discontinued. Mandrel 14 with its porous conductive layer thereon is removed from enclosure 14 in any suitable manner (not shown) as through a removable wall portion.

Various non-porous mandrels may be employed which are of metallic or non-metallic materials. For example, non-porous ceramic materials are suitable. Various high temperature melting point metals may be employed in the process. However, we prefer to employ tantalum or niobium. Since layer 18 is subsequently removed from mandrel 14 to form a self-supporting structure it is determined initially prior to the spraying of the molten metal on the mandrel as to the subsequent removal procedure. Such removal, which is dependent upon the type of material employed for the mandrel, is mechanical removal, chemical etching, or the employment of a release agent such as a graphite coating on the mandrel.

In FIGURE 2 of the drawing, there is shown mandrel 14 with layer 18 thereon which is a plasma arc spray-deposited porous conductive layer of minute high melting point metallic particles. This layer is self-supporting as opposed to a layer being coated on a porous or other type of substrate whereby a composite body is formed.

In FIGURE 3 of the drawing, there is shown layer 18 to which has been affixed an electrical lead 19 in any suitable manner. Electrode 18 is removed from mandrel 14 shown in FIGURE 2 by mechanical separation. As it is discussed above, other methods of separation may be employed such as etching chemically to remove layer 18 from mandrel 14 or a release agent, for example graphite, coated on mandrel 14 prior to the deposition of layer 18 thereon.

Examples of forming electrodes in accordance with this invention were as follows:

*Example I*

Apparatus was set up in accordance with FIGURE 1 of the drawing wherein the plasma arc spray gun and the copper mandrel were maintained within an inert gas atmosphere of argon during the plasma arc spray process. The mandrel was a two inch diameter copper disc which was ⅛ inch thick. The outlet end of the plasma arc spray nozzle was positioned approximately twelve inches from the deposition surface of the copper substrate. Tantalum in powder form having particle sizes ranging from −100 to +200 mesh and an argon carrier gas were fed to the plasma arc spray gun. Upon activating the device, the tantalum metal was fed through the nozzle portion thereof and was carried by the plasma onto the surface of the copper mandrel. In approximately one minute, a layer of approximately 0.015 inch thickness was formed on the surface of the copper mandrel.

The gun was shut off and the mandrel with the plasma arc spray-deposited layer of tantalum was cooled to room temperature in the argon atmosphere. The argon gas was discontinued and the mandrel with tantalum layer was removed. The self-supporting tantalum layer was removed from the copper mandrel by chemical dissolution of the copper to produce a porous body of minute tantalum particles. A thin tantalum wire electrical lead was affixed to the layer by spot welding thereby providing an electrode.

This electrode was then anodized to 100 volts by a conventional electrolytic process utilizing dilute phosphoric acid electrolyte to form a layer of oxide on the tantalum electrode.

The capacitance of the above electrode which had dimensions of 1 cm. x 1 cm. was measured on a bridge using a concentrated hydrochloric acid electrolyte. The other electrode of the capacitor was platinum foil immersed in the electrolyte. A capacitance of 5.65 microfarads was found. If this sample had been a solid non-porous tantalum body, a capacitance value of 0.3 microfarads would be expected. This increase of capacitance for the porous body formed in accordance with our invention is due to the increased surface area available in the porous body.

*Example II*

Apparatus was set up in accordance with FIGURE 1 of the drawing wherein the plasma arc spray gun and the copper mandrel were maintained within an inert gas atmosphere of argon during the plasma arc spray process. The mandrel was a two inch diameter copper disc which was ⅛ inch thick. The outlet end of the plasma arc spray nozzle was positioned approximately twelve inches from the deposition surface of the copper substrate. Tantalum in powder form having particle sizes ranging from −200 to +325 mesh and an argon carrier gas were fed to the plasma arc spray gun. Upon activating the device, the tantalum metal was fed through the nozzle portion thereof and was carried by the plasma onto the surface of the copper mandrel. In approximately one-half minute, a layer of approximately 0.008 inch thickness was formed on the surface of the copper mandrel.

The gun was shut off and the mandrel with the plasma arc spray-deposited layer of tantalum was cooled to room temperature in the argon atmosphere. The argon gas was discontinued and the mandrel with tantalum layer was removed. The self-supporting tantalum layer was removed from the copper mandrel by chemical dissolution of the coper to produce a porous body of minute tantalum particles. A thin tantalum wire electrical lead was affixed to the layer by spot welding thereby providing an electrode.

This electrode was then anodized to 100 volts by a conventional electrolytic process utilizing a dilute phosphoric acid electrolyte to form a layer of oxide on the tantalum electrode.

The capacitance of the above electrode which had dimensions of 1 cm. x 1 cm. was measured on a bridge using a concentrated hydrochloric acid electrolyte. The other electrode of the capacitor was platinum foil immersed in the electrolyte. A capacitance of 3.69 microfarads was found. If this sample had been a solid non-porous tantalum body, a capacitance value of 0.3 microfarad would be expected. This increase of capacitance for the porous body formed in accordance with our invention is due to the increased surface area available in the porous body.

While other modifications of the invention and variations of method which may be employed within the scope of the invention have not been described, the invention is intended to include such that may be embraced within the following claims.

What we claim as new and desire to secure by Letters Patent of the United States is:

1. An electrolytic device comprising a container, an electrolyte situated within said container, a self-supporting porous body of high melting point metal at least partially submerged within said electrolyte, said metal forming said porous body having a melting temperature of at least 1200° C. and said porous body being the plasma arc spray deposited product of said metal deposited at a distance from 6 to 18 inches, and an electrical lead connected to said porous body to permit external electrical connection to said porous body.

2. An electrical device electrode comprising a self-supporting porous body of a high melting point metal and an anodic dielectric film formed on the surface of said porous body, said metal forming said porous body having a melting temperature of at least 1200° C. and said porous body being the plasma arc spray deposited product of said metal deposited at a distance of from 6 to 18 inches.

3. An electrical device electrode according to claim 2 wherein said high melting point metal is a metal selected from the group consisting of tantalum and niobium and said dielectric film is an oxide of said metal.

References Cited

UNITED STATES PATENTS

| | | | |
|---|---|---|---|
| 2,299,228 | 10/1942 | Gray et al. | 317—230 |
| 2,375,211 | 5/1945 | Brennan | 317—230 |
| 2,871,425 | 1/1959 | Burnham | 317—230 |
| 3,075,066 | 1/1963 | Yenni et al. | 219—76 |

JAMES D. KALLAM, *Primary Examiner.*